July 1, 1930.  A. K. SHEPPARD  1,768,937
LIFTER
Filed Dec. 21, 1928
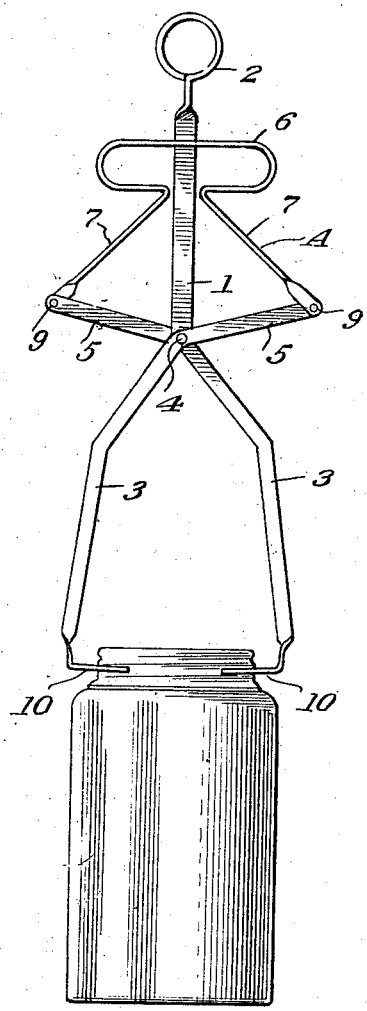
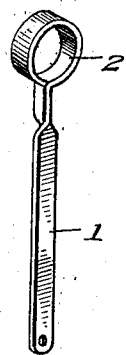
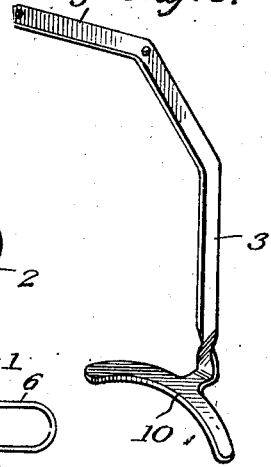
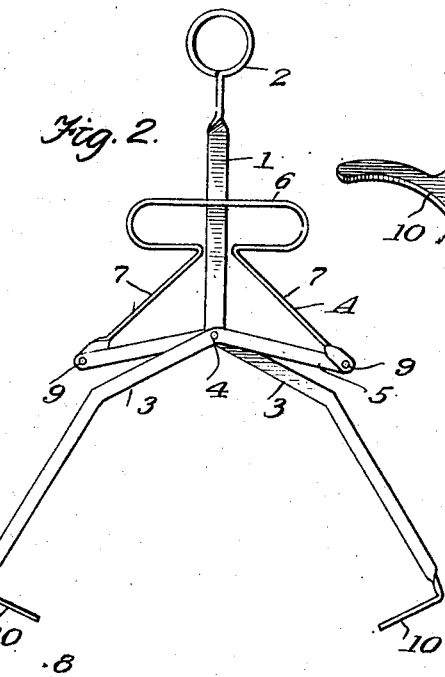
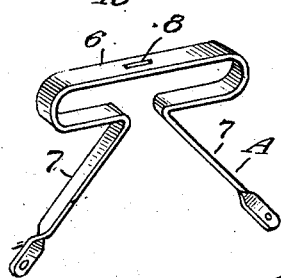
Albert K. Sheppard
INVENTOR
BY Victor J. Evans
ATTORNEY
WITNESS:

Patented July 1, 1930

1,768,937

UNITED STATES PATENT OFFICE

ALBERT K. SHEPPARD, OF PORT HAMMOND, BRITISH COLUMBIA, CANADA

LIFTER

Application filed December 21, 1928. Serial No. 327,571.

This invention relates to a lifter for lifting jars and other objects, the general object of the invention being to provide a pair of jaw members, a bar to which the jaw members are pivoted and a handle member slidably arranged on the bars and connected with the jaw members, the parts being so arranged and constructed that when the handle member is moved in one direction, the jaw members are automatically moved to gripping position and held in said position, and when the handle member is moved in an opposite direction, the jaw members are moved to and held in open position.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a view showing the device in use.

Figure 2 is a view showing the device in open position.

Figure 3 is a perspective view of the handle member.

Figure 4 is a view of the bar.

Figure 5 is a view of one of the jaws.

In these views, the numeral 1 indicates a bar having its upper end twisted and formed with an eye 2 so that the ends of the eye forming part are parallel with the flat sides of the bar. A pair of jaw members 3 is pivotally connected with the lower end of the bar by a pin 4, each jaw member being formed with an extension 5 which extends beyond the pivotal point, and these extensions are divergently arranged with respect to the bar when the jaws are in gripping position. A handle member A, composed of a flat looped part 6 and the divergent limbs 7, is slidably arranged on the bar by having a slot 8 formed in the central portion of the looped part and through which the bar passes. This handle member is formed of metal which has a certain degree of resiliency and its limbs have their extremities pivotally connected with the extremities of the extensions 5, as shown at 9. The jaw members are each formed at its end with an arc-shaped gripping part 10 which is arranged in a plane at substantially rightangles to the major portion of the member.

The parts are so arranged and constructed that when the handle member A is moved downwardly on the bar, the diverging parts 7 thereof, acting on the extensions 5, will move said extensions downwardly and thus rock the jaw members on the pivot pin 4 so that the gripping parts 10 will move away from each other. The handle member, during this action, will expand slightly until the pivotal points 9 move beyond a plane passing through the pivotal points 4 and 9, when the resilient nature of the handle member will cause the same to contract, whereby the opening movement of the jaw members will be completed and the said members held in open position, as shown in Figure 2. When the handle member is moved upwardly again, the reverse action takes place, so that the jaw members are moved toward each other.

In picking up a jar, for instance, as shown in Figure 1, the thumb of one hand is placed in the eye 2, and two fingers of the same hand are placed in the loop 6 of the handle member. Then the fingers are moved downwardly or away from the thumb so as to slide the handle member on the rod and thus open the jaw members so that the gripping parts 10 can be placed alongside the top of the jar or other object to be lifted. Then the fingers are moved upwardly or toward the thumb so as to move the handle member upwardly to close the jaw members upon the object, as shown in Figure 1. It will be understood that the tighter the hand is closed, the more pressure is placed on the gripping elements and after the gripping elements have been moved into engagement with the object, the thumb may be removed from the eye as the weight of the object will hold the gripping elements in firm engagement with said object.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a flat bar, a pair of single jaw members formed of flat stock, and arranged on opposite sides of the lower end of the bar, a pivot pin passing through the members and the bar, said members having diverging extensions at their upper ends, a handle member formed of flat stock and comprising a straight top part having a slot at its center and with its ends looped inwardly and diverging portions connected with the inner ends of the looped parts, the extremities of the diverging portions being pivoted to the upper ends of the extensions, the bar passing through the slot and between the inner ends of the looped portions and arc-shaped gripping elements connected at their centers to the lower ends of the jaw members.

In testimony whereof I affix my signature.

ALBERT K. SHEPPARD.